(12) United States Patent
Woo et al.

(10) Patent No.: US 10,642,108 B2
(45) Date of Patent: May 5, 2020

(54) POLYMER DISPERSED-TYPE LIQUID CRYSTAL ELEMENT COMPRISING NEUTRALIZED CONDUCTIVE POLYMER TRANSPARENT ELECTRODE AND METHOD FOR PRODUCING SAME

(71) Applicant: LG CHEM, LTD., Seoul (KR)

(72) Inventors: Yu-Jin Woo, Daejeon (KR);
Mi-Kyoung Kim, Daejeon (KR);
Jung-Sun You, Daejeon (KR)

(73) Assignee: LG CHEM, LTD., Seoul (KR)

( * ) Notice: Subject to any disclaimer, the term of this patent is extended or adjusted under 35 U.S.C. 154(b) by 307 days.

(21) Appl. No.: 15/516,764

(22) PCT Filed: Oct. 22, 2015

(86) PCT No.: PCT/KR2015/011232
§ 371 (c)(1),
(2) Date: Apr. 4, 2017

(87) PCT Pub. No.: WO2016/068546
PCT Pub. Date: May 6, 2016

(65) Prior Publication Data
US 2017/0299911 A1    Oct. 19, 2017

(30) Foreign Application Priority Data

Oct. 27, 2014 (KR) .......... 10-2014-0145777
Oct. 12, 2015 (KR) .......... 10-2015-0142420

(51) Int. Cl.
*G02F 1/1343* (2006.01)
*E06B 3/67* (2006.01)
(Continued)

(52) U.S. Cl.
CPC ........ *G02F 1/13439* (2013.01); *E06B 3/6722* (2013.01); *E06B 9/24* (2013.01);
(Continued)

(58) Field of Classification Search
CPC ............. G02F 1/134309; G02F 1/1334; G02F 1/13439; E06B 9/24; E06B 3/6722
See application file for complete search history.

(56) References Cited

U.S. PATENT DOCUMENTS

| | | | |
|---|---|---|---|
| 10,240,057 B2 * | 3/2019 | Kim ...................... | C09D 11/102 |
| 2008/0036960 A1 * | 2/2008 | Ding ................ | G02F 1/133377 |
| | | | 349/156 |

(Continued)

FOREIGN PATENT DOCUMENTS

| | | |
|---|---|---|
| CN | 101558683 A | 10/2009 |
| CN | 101821815 A | 9/2010 |

(Continued)

OTHER PUBLICATIONS

Machine Translation Kr-20110030410-A (Year: 2011).*

(Continued)

*Primary Examiner* — Daniel McNally
(74) *Attorney, Agent, or Firm* — Birch, Stewart, Kolasch & Birch, LLP

(57) ABSTRACT

This invention relates to a polymer-dispersed liquid crystal device, including a substrate layer; a neutralized first electrode layer formed on the substrate layer; a polymer-dispersed liquid crystal layer formed on the first electrode layer; a neutralized second electrode layer formed on the polymer-dispersed liquid crystal layer; and a substrate layer formed on the second electrode layer, and to a method of manufacturing the same.

10 Claims, 3 Drawing Sheets

(51) Int. Cl.
*E06B 9/24* (2006.01)
*G02F 1/1334* (2006.01)

(52) U.S. Cl.
CPC ...... *G02F 1/1334* (2013.01); *G02F 1/134309* (2013.01); *E06B 2009/2464* (2013.01)

(56) References Cited

U.S. PATENT DOCUMENTS

| | | | |
|---|---|---|---|
| 2009/0148722 A1* | 6/2009 | Louwet | C08L 65/00 428/690 |
| 2009/0156752 A1 | 6/2009 | Uchida et al. | |
| 2010/0019235 A1* | 1/2010 | Lizunni; Yasuhiro | H01L 51/0013 257/40 |
| 2011/0117329 A1 | 5/2011 | Jonas et al. | |
| 2012/0168682 A1 | 7/2012 | Kim et al. | |

FOREIGN PATENT DOCUMENTS

| | | | |
|---|---|---|---|
| CN | 101883811 A | | 11/2010 |
| JP | 2011-201933 A | | 10/2011 |
| JP | -2011201933 A | * | 10/2011 |
| KR | 10-2008-0065637 A | | 7/2008 |
| KR | 10-2011-0030410 A | | 3/2011 |
| KR | 10-1020879 B1 | | 3/2011 |
| KR | -20110030410 A | * | 3/2011 |
| KR | 10-2012-0077112 A | | 7/2012 |
| KR | 10-2014-0086516 A | | 7/2014 |
| KR | -20140086516 A | * | 7/2014 |

OTHER PUBLICATIONS

Machine Translation Kr-20140086516-A (Year: 2014).*
International Search Report issued in PCT/KR2015/011232 (PCT/ISA/210), dated Mar. 31, 2016.

* cited by examiner

POLYMER DISPERSED-TYPE LIQUID CRYSTAL ELEMENT COMPRISING NEUTRALIZED CONDUCTIVE POLYMER TRANSPARENT ELECTRODE AND METHOD FOR PRODUCING SAME

TECHNICAL FIELD

This application claims the benefit of Korean Patent Application Nos. 10-2014-0145777, filed Oct. 27, 2014, and 10-2015-0142420, filed Oct. 12, 2015, which are hereby incorporated by reference in their entireties into this application.

The present invention relates to a polymer-dispersed liquid crystal device including a neutralized conductive polymer transparent electrode and a method of manufacturing the same.

BACKGROUND ART

In the case of a polymer-dispersed liquid crystal device, indium tin oxide, which is used as an electrode material, is expensive due to the use of a rare metal, and requires a vacuum deposition process to form an electrode, undesirably causing complicated processing and making it impossible to manufacture a large-area device. Furthermore, it is weakly resistant to impacts, and is thus limited in usefulness in manufacturing flexible devices.

Recently, attempts are being made to form a transparent electrode layer using a flexible conductive polymer such as poly(ethylenedioxythiophene) as the electrode material of a polymer-dispersed liquid crystal device.

However, in the fabrication of a polymer-dispersed liquid crystal device, when a poly(ethylenedioxythiophene) layer having strong acidity and a polymer-dispersed liquid crystal layer come into direct contact with each other, they are dissolved in each other and may degrade, undesirably losing respective functions as the electrode and the driving part. Thus, with the goal of solving problems with the conventional polymer-dispersed liquid crystal device using the conductive polymer transparent electrode, for example, Korean Patent Application No. 2008-0065637, entitled "Electrically conductive polymer coating composition for manufacturing electrode of polymer-dispersed liquid crystal smart window", discloses an electrically conductive coating composition for improving the durability of an electrically conductive coating film by forming a cured coating without deteriorating electrical conductivity by adding poly(ethylenedioxythiophene) with trialkoxysilanealkyl(meth)acrylate as an electrode coating material of a polymer-dispersed liquid crystal smart window.

Although the durability of the conductive coating film itself may be improved, the degree of improvement thereof is not satisfactory and the manufacturing cost is increased due to the essential use of a photoinitiator.

DISCLOSURE

Technical Problem

Accordingly, the present invention has been made keeping in mind the problems encountered in the related art, and the present invention is intended to provide a method of manufacturing a polymer-dispersed liquid crystal device including a neutralized conductive polymer transparent electrode to solve problems related to the use of a conductive polymer transparent electrode in a conventional polymer-dispersed liquid crystal device.

Technical Solution

Therefore, the present invention provides a polymer-dispersed liquid crystal device, comprising: a substrate layer; a neutralized first electrode layer formed on the substrate layer; a polymer-dispersed liquid crystal layer formed on the first electrode layer; a neutralized second electrode layer formed on the polymer-dispersed liquid crystal layer; and a substrate layer formed on the second electrode layer.

In addition, the present invention provides a method of manufacturing a polymer-dispersed liquid crystal device including a neutralized conductive polymer transparent electrode, comprising: a) forming a first electrode layer by applying a conductive polymer ink composition including a neutralized PEDOT:PSS aqueous dispersion on a substrate layer and then performing thermal treatment; b) forming a polymer-dispersed liquid crystal layer on the first electrode layer; c) bonding a second electrode layer formed in the same manner as in a) to the polymer-dispersed liquid crystal layer; and d) curing the polymer-dispersed liquid crystal layer via irradiation with a light source.

Advantageous Effects

According to the present invention, a transparent electrode of a polymer-dispersed liquid crystal device includes a conductive polymer electrode including poly(ethylenedioxythiophene) having adjusted acidity (pH), thus decreasing damage to the polymer-dispersed liquid crystal layer, thereby preventing device malfunction.

According to the present invention, when the conductive polymer transparent electrode manufactured using conductive polymer ink having adjusted pH is employed, driving voltage equal to that of a device using an ITO electrode can be exhibited and superior device performance can result.

BEST MODE

Hereinafter, a detailed description will be given of the present invention.

Figure 1:
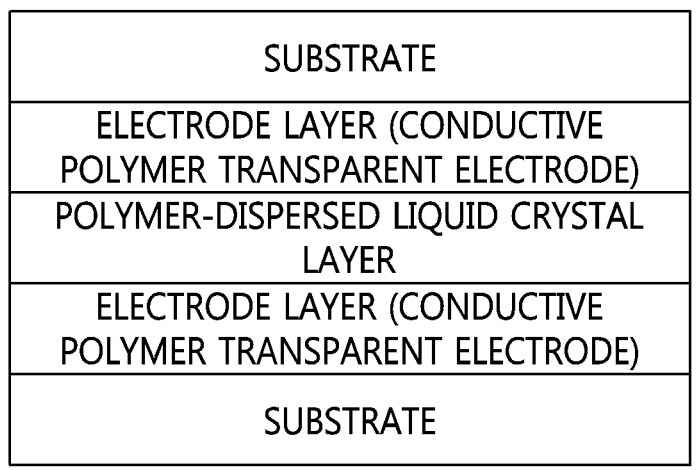
FIG. 1 schematically shows the structure of a polymer-dispersed liquid crystal device according to the present invention.
Figure 2:
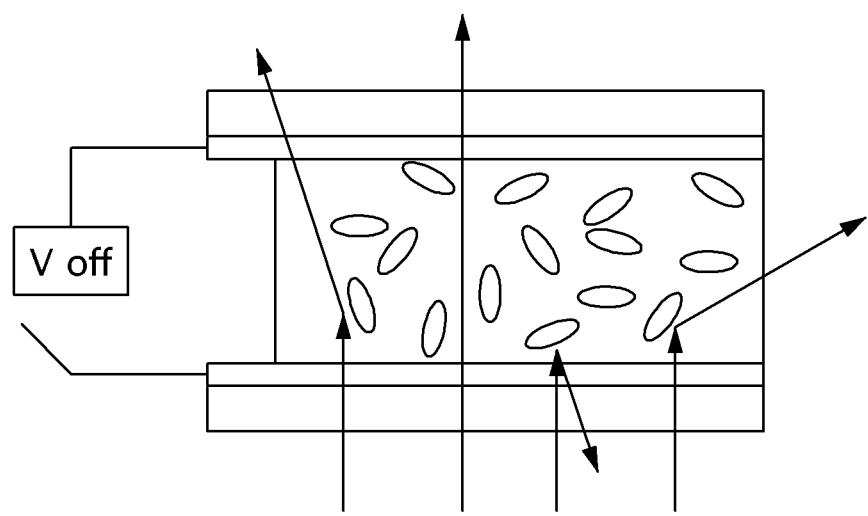
FIG. 2 schematically shows the polymer-dispersed liquid crystal device according to an embodiment of the present invention when voltage is not applied.
Figure 3:
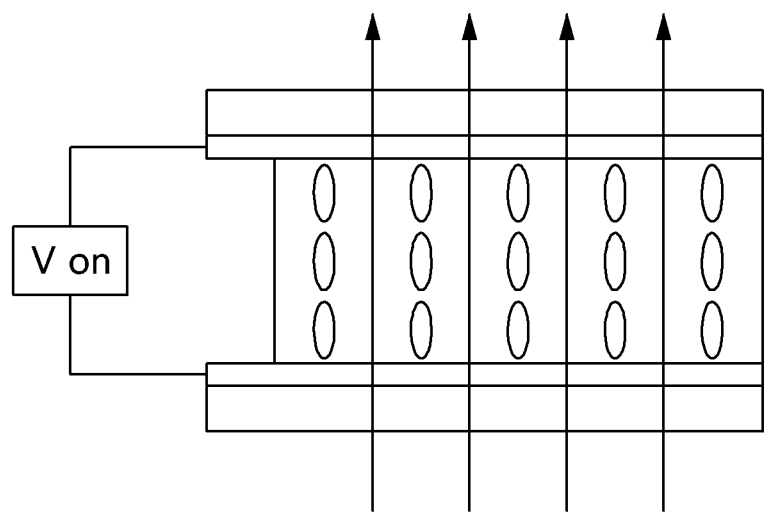
FIG. 3 schematically shows the polymer-dispersed liquid crystal device according to an embodiment of the present invention when voltage is applied.

As shown in FIG. 1, the present invention addresses a polymer-dispersed liquid crystal device, comprising a substrate layer, a neutralized first electrode layer formed on the substrate layer, a polymer-dispersed liquid crystal layer formed on the first electrode layer, a neutralized second electrode layer formed on the polymer-dispersed liquid crystal layer, and a substrate layer formed on the second electrode layer.

The first electrode layer and the second electrode layer include a conductive polymer, and are preferably formed as described in the following manufacturing method by applying a conductive polymer ink composition including a neutralized PEDOT:PSS (poly(3,4-ethylenedioxythiophene):poly(styrenesulfonate)) aqueous dispersion on respective substrate layers.

Each of the neutralized first electrode layer and second electrode layer of the present invention, manufactured as above, may include PEDOT:PSS.

Each of the neutralized first electrode layer and second electrode layer preferably has a pH of 4.0 to 8.0, and more preferably 5.0 to 7.0.

Each of the neutralized first electrode layer and second electrode layer preferably has a thickness of 50 to 500 nm.

In the polymer-dispersed liquid crystal layer of the present invention, polymer-dispersed liquid crystals (PDLCs) may be applied to a transmissive display having high luminance or a reflective display having high contrast, and are a composite material in which liquid crystal molecules having a size of ones of micrometers are dispersed in a polymer between the conductive films. Based on the driving principle of PDLCs, light, which is incident on the polymer layer in which liquid crystals are dispersed, is scattered due to the difference in refractive index between the liquid crystals and the polymer and thus an opaque state may result, but when an electric field is applied thereto, the orientation of liquid crystals is aligned and the refractive index is changed, thereby controlling the scattering and transmission of light, resulting in a transparent state.

In the present invention, the polymer-dispersed liquid crystal layer is not particularly limited but preferably has a thickness of 1 to 100 μm. The polymer-dispersed liquid crystal layer may be a polymer-dispersed liquid crystal layer having a composition including a reactive monomer diluent, a photoinitiator mixture and a surfactant, and specifically a polymer-dispersed liquid crystal layer comprising 1 to 99 wt % of a reactive monomer diluent, 0.1 to 10 wt % of a photoinitiator mixture and 0.1 to 10 parts by weight of a surfactant.

In the present invention, the substrate may be used without limitation so long as it is typically useful in the art, and is preferably PET.

Also, the polymer-dispersed liquid crystal device may be utilized in a liquid crystal display (LCD), such as a polymer-dispersed liquid crystal smart window, e-paper, a transparent display, etc.

In order to manufacture the polymer-dispersed liquid crystal device, the present invention addresses a method of manufacturing a polymer-dispersed liquid crystal device including a neutralized conductive polymer transparent electrode, comprising the steps of: a) forming a first electrode layer by applying a conductive polymer ink composition including a neutralized PEDOT:PSS aqueous dispersion on a substrate layer and then performing thermal treatment; b) forming a polymer-dispersed liquid crystal layer on the first electrode layer; c) bonding a second electrode layer formed in the same manner as in step a) to the polymer-dispersed liquid crystal layer; and d) curing the polymer-dispersed liquid crystal layer through irradiation with a light source.

The conductive polymer ink composition including a neutralized PEDOT:PSS (poly(3,4-ethylenedioxythiophene):poly(styrenesulfonate)) aqueous dispersion may further include at least one selected from among 1) dimethyl sulfoxide (DMSO), 2) a solvent and 3) a surfactant.

The PEDOT:PSS (poly(3,4-ethylenedioxythiophene): poly(styrenesulfonate)), which is a polymer mixture of PEDOT and PSS ionomers, is a charged macromolecular salt, namely a conductive polymer material, and the PEDOT:PSS (poly(3,4-ethylenedioxythiophene): poly(styrenesulfonate)) aqueous dispersion indicates an aqueous dispersion solution including a PEDOT:PSS polymer or copolymer.

The neutralized PEDOT:PSS (poly(3,4-ethylenedioxythiophene):poly(styrenesulfonate)) aqueous dispersion indicates a PEDOT:PSS aqueous dispersion subjected to a neutralization process.

The neutralized PEDOT:PSS (poly(3,4-ethylenedioxythiophene):poly(styrenesulfonate)) aqueous dispersion may be obtained by adding a PEDOT:PSS aqueous dispersion solution with an amine compound and an organic solvent that enables phase separation.

The neutralized PEDOT:PSS aqueous dispersion may be obtained through the steps of a') mixing the PEDOT:PSS (poly(3,4-ethylenedioxythiophene):poly(styrenesulfonate)) aqueous dispersion with an amine compound and an organic solvent that undergoes phase separation from water so as to be neutralized; b') subjecting a mixed solution obtained in step a') to phase separation into a lower water layer including the neutralized PEDOT:PSS aqueous dispersion and an upper organic layer including the amine compound and the organic solvent; c') removing the upper organic layer from the water layer and the organic layer, which are phase-separated; and d') washing the water layer having no organic layer with an organic solvent, thus removing the upper organic layer.

The amine compound that is added may be at least one selected from the group consisting of a primary amine compound, a secondary amine compound, a tertiary amine compound and a pyridine compound, and specifically, the amine compound may be at least one selected from the group consisting of 3,5-lutidine, 2,4,6-collidine, and triethylamine.

In order to realize phase separation of the lower water layer including the PEDOT:PSS aqueous dispersion and the upper organic layer including the amine compound and the organic solvent, the organic solvent, which is phase-separated from the water that is added, may be exemplified by diethyl ether.

In step a'), the organic solvent may be used in an amount of 50 to 500 parts by weight based on 100 parts by weight of the PEDOT:PSS aqueous dispersion.

Also, the amine compound in step a') is preferably contained so that its amount is 0.1 to 50 wt % in the organic layer in step b').

In the method of preparing the neutralized PEDOT:PSS aqueous dispersion, the mixing time in step a') preferably falls in the range of 5 min to 24 hr, and more preferably 30 min to 4 hr. The mixing time may vary depending on the concentration.

In step a'), examples of a physical mixing process may include, but are not limited to, mixing using a shaker, stirring using a magnetic bar, and mixing using a vortex.

Thereafter, the upper organic layer is removed, and washing the water layer having no organic layer with an organic solvent is repeated 1 to 5 times, and preferably 2 to 3 times, thereby removing the upper organic layer, resulting in a neutralized PEDOT:PSS aqueous dispersion.

During the removal of the organic layer, some of the water layer may be lost, and thus the amount of the PEDOT:PSS aqueous dispersion that is initially added is 100 parts by weight, and the amount of the PEDOT:PSS aqueous dispersion that is finally obtained through the above procedures may be 70 to 90 parts by weight.

The amount of the PEDOT:PSS aqueous dispersion is preferably 10 to 60 wt % based on the total weight of the ink composition.

In a preferred embodiment of the present invention, as the PEDOT:PSS aqueous dispersion, PH-1000, available from Heraeus, was used.

The 1) dimethyl sulfoxide (DMSO) is added to increase the conductivity of the ink composition, and the amount thereof is preferably 0.3 to 5.0 wt % based on the total weight of the ink composition. If the amount thereof is less than 0.3 wt %, an effect of improving conductivity is insignificant. On the other hand, if the amount thereof exceeds 5.0 wt %, the conductivity of the ink may decrease and low stability may result.

The 2) solvent may be at least one selected from among deionized water (DI water) and a polyhydric alcohol. The DI water functions to disperse the PEDOT:PSS aqueous dispersion, and the amount thereof is preferably 10 to 60 wt % based on the total weight of the ink composition. If the amount of the DI water exceeds 60 wt % based on the total weight of the ink composition, the ink composition may not spread on the substrate due to the high surface tension of the ink and it may be difficult to perform a jetting process. On the other hand, if the amount thereof is less than 10 wt %, the resulting ink is not suitable for use in an inkjetting process due to its high viscosity. Examples of the polyhydric alcohol may include, but are not necessarily limited to, diethylene glycol, ethylene glycol, propylene glycol, glycerol, and sorbitol. Preferably useful is propylene glycol or glycerol. The polyhydric alcohol is added to the solvent in order to improve the dispersibility and conductivity of the ink composition. The amount thereof is preferably 1 to 45 wt % based on the total weight of the ink composition. If the amount thereof exceeds 45 wt %, conductivity may decrease. On the other hand, if the amount thereof is less than 1 wt %, no improvement in conductivity is apparent.

In order to improve the spreadability of the ink composition, a surfactant may be further added, and the amount thereof is preferably 0.01 to 3.0 wt % based on the total weight of the ink composition. If the amount thereof is less than 0.01 wt %, desired spreadability cannot be obtained. On the other hand, if the amount thereof exceeds 3.0 wt %, the conductivity of the ink may decrease. The surfactant may be a nonionic surfactant, such as a fluorine-based surfactant, but the present invention is not limited thereto.

The conductive polymer ink composition preferably has a pH of 4.0 to 8.0, and more preferably 5.0 to 7.0. Given the above pH range, the pH of the ink composition may be adjusted within a desired range while maintaining the dispersibility of the ink composition, thus solving problems in which the functions of the electrode and the driving part are lost through the reaction with the upper polymer-dispersed liquid crystal layer of the device due to strong acidity when used as the transparent electrode material of the device. If the pH of the ink composition is less than 4.0, the upper polymer-dispersed liquid crystal layer may be damaged due to high activity. On the other hand, if the pH thereof exceeds 8.0, the upper polymer-dispersed liquid crystal layer may be damaged due to basicity.

When compared with an ITO electrode requiring a deposition process, neutralized conductive polymer ink having adjusted acidity enables the formation of a device using a solution process, thus exhibiting advantages in the manufacturing process.

The thickness of the first electrode layer and the second electrode layer may vary depending on the required electrical properties (e.g. conductivity), and is preferably 50 to 500 nm. When the electrode layer is thick, conductivity may increase and thus superior electrode properties may be obtained, but transmittance may decrease. If the thickness thereof is less than the above range, the driving voltage may be excessively increased due to low conductivity. On the other hand, if the thickness thereof exceeds the above range, the function as the transparent electrode may be lost due to low transmittance.

The thermal treatment in step a) may be performed on, for example, a hot plate at 80 to 150° C. for 10 to 50 min.

In step c), the second electrode layer formed in the same manner as in step a) is bonded to the polymer-dispersed liquid crystal layer, whereby the polymer-dispersed liquid crystal layer is interposed between the first electrode layer and the second electrode layer. Subsequently, in step d), a light source is radiated onto the polymer-dispersed liquid crystal layer, thus curing the polymer-dispersed liquid crystal layer, whereby the polymer-dispersed liquid crystal layer is bonded between the electrode layers.

The polymer-dispersed liquid crystal layer typically includes a monomer, a photoinitiator, a coupling agent, and an oligomer, and may be cured through irradiation with UV light using a UV curing machine.

The first electrode layer and the second electrode layer, namely the conductive polymer transparent electrodes, which are formed using the conductive polymer ink composition, are superior in both transmittance and conductivity. Specifically, transmittance may be 85 to 95% (including the substrate), and sheet resistance may approximate 150 to 350 ($\Omega/\square$).

Mode for Invention

A better understanding of the present invention may be obtained via the following examples, which are set forth to illustrate the present invention, but are not to be construed as limiting the scope of the present invention, and substitutions and modifications thereof should also be understood as falling within the scope defined by the accompanying claims.

<Preparation of Conductive Polymer Ink Composition>

49.4 wt % of CLEVIOUS PH-1000 (available from Heraeus) as a PEDOT:PSS aqueous dispersion was added with 49.4 wt % of diethyl ether and 1.2 wt % of 3,5-lutidine. Mixing was performed for 2 hr so as to blend a water layer with an organic layer, after which the organic layer was removed. Diethyl ether was further added to wash the water layer, and the organic layer was then decanted. Washing the water layer was repeated three times, thus obtaining a neutralized PEDOT:PSS aqueous dispersion. 39.1 wt % of the PEDOT:PSS aqueous dispersion solution thus obtained was added with 1.6 wt % of DMSO, 33.1 wt % of DI water, 6.5 wt % of propylene glycol, and 0.1 wt % of a surfactant F-555 (available from DIC) and stirred, thus preparing a conductive polymer ink composition.

EXAMPLE 1

A substrate (PET) was spin-coated with the conductive polymer ink composition (500 rpm, 9 sec) and then dried on a hot plate at 120° C./30 min, thus forming an electrode layer having a pH adjusted to 4.2. The electrode layer was bar-coated with a polymer-dispersed liquid crystal solution and then further coated with an electrode layer including a conductive polymer solution and thus integrated, followed by curing through irradiation with a light source, thereby manufacturing a polymer-dispersed liquid crystal device. The terminal for applying voltage was formed by attaching a piece of conductive tape or the corresponding material to the upper surface of the electrode layer.

EXAMPLE 2

A polymer-dispersed liquid crystal device was manufactured in the same manner as in Example 1, with the exception that the ink composition having a pH adjusted to 5.1 using 2,4,6-collidine was used.

EXAMPLE 3

A polymer-dispersed liquid crystal device was manufactured in the same manner as in Example 1, with the exception that the ink composition having a pH adjusted to 7.8 using triethylamine was used.

COMPARATIVE EXAMPLE 1

A polymer-dispersed liquid crystal device was manufactured by forming an ITO electrode layer through sputtering on a substrate (PET) and then bar-coating it with a polymer-dispersed liquid crystal solution.

COMPARATIVE EXAMPLE 2

A polymer-dispersed liquid crystal device was manufactured in the same manner as in Example 1, with the exception that an electrode layer, the acidity of which was not adjusted, was formed using the composition of Table 1 below.

<Test of Electrode Properties>

The electrode layers of Examples 1 to 3 and Comparative Examples 1 and 2 were measured for pH using a pH Meter 350 available from JEWAY. The results thereof are shown in Table 1 below.

Also, transmittance was measured using a VSR-400 available from NIPPON DENSHOKU. The results thereof are shown in Table 1 below.

Also, sheet resistance was measured using an MCP-T600 available from MITSUBISHI CHEMICAL CORPORATION. The results thereof are shown in Table 1 below.

PH1000: Conductive polymer aqueous dispersion solution, CLEVIOS PH1000 available from Heraeus <Driving Principle of Device>

The liquid crystal array in the polymer-dispersed liquid crystal layer is adjusted depending on whether the voltage was applied or not, thereby controlling the scattering and transmission of light. When voltage is not applied to the polymer-dispersed liquid crystal layer (off), small liquid crystal droplets are randomly arranged and light is scattered due to refraction of the liquid crystal droplets and the polymer matrix, resulting in an opaque state. When voltage is applied (on), the liquid crystal droplets are aligned to thus decrease a difference in refractive index, whereby light may pass through the device, resulting in a transparent state.

<Evaluation of Stability of Device>

In order to evaluate the stability of the devices of Examples 1 to 3 and Comparative Examples 1 and 2, whether degradation occurred or not was observed with the naked eye. Here, observation was performed in an off state in which voltage was not applied after the completion of fabrication of the device.

The devices of Comparative Example 1 (ITO electrode) and Examples 1 to 3 (conductive polymer transparent electrode having adjusted acidity) were not particularly notable and thus were represented by "No". In this case, small liquid crystal droplets were randomly arranged, and light was scattered due to the refraction of the liquid crystal droplets and the polymer matrix, resulting in a dark state.

In Comparative Example 2 (conductive polymer transparent electrode having not adjusted acidity), irregular spots were observed. This is because the conductive polymer transparent electrode has high acidity (pH 1.9) and thus is degraded due to the reaction with the polymer-dispersed liquid crystal layer formed thereon.

<Evaluation of Electro-Optical Properties of Device>

Voltage was applied to the devices of Examples 1 to 3 and Comparative Examples 1 and 2, and driving of the devices and the driving voltage were observed and measured. The results thereof are shown in Table 2 below. The driving voltage is defined as the voltage at which the maximum transmittance is 90%.

TABLE 1

|  | C. Ex. 1 | C. Ex. 2 | Ex. 1 | Ex. 2 | Ex. 3 |
| --- | --- | --- | --- | --- | --- |
| Composition: (wt %) | ITO | PH1000: 45.7<br>DI water: 19.7<br>Propylene glycol: 14.6<br>Methanol: 9.1<br>DMSO: 2.4<br>Glycerol: 2.4<br>Surfactant: 0.6<br>Methyl isobutyl ketone: 0.4 | PEDOT: PSS aqueous dispersion<br>solution: 39.1<br>DI water: 33.1<br>Methanol: 19.6<br>DMSO: 16<br>Propylene glycol: 6.5<br>Surfactant: 0.1 | | |
| Acidity control (amine used) | — | No | Yes (3,5-lutidine) | Yes (2,4,6-collidine) | Yes (Triethylamine) |
| pH | — | 1.9 | 4.2 | 5.1 | 7.8 |
| Processing | Sputtering | | Spin coating | | |
| Transmittance (%) | 88.8 | 84.7 | 84.7 | 85.2 | 83.0 |
| Sheet resistance (Ω/□) | 270 | 292 | 248 | 261 | 276 |

TABLE 2

|  | C. Ex. 1 | C. Ex. 2 | Ex. 1 | Ex. 2 | Ex. 3 |
|---|---|---|---|---|---|
| Degradation | No | Yes | No | No | No |
| Driving voltage (V) | 23.6 | — | 49.4 | 24.1 | 23.7 |
| Driving of device | ○ | x | ○ | ○ | ○ |

As is apparent from Table 2, in Comparative Example 1 and Examples 1 to 3, all the devices were driven when the voltage was applied. In particular, in Examples 2 and 3, the driving voltage was equal to that of Comparative Example 1.

In Comparative Example 2, the conductive polymer transparent electrode layer and the polymer-dispersed liquid crystal layer reacted, and thus both layers were degraded, whereby the device was not driven even when voltage was applied.

The invention claimed is:

1. A method of manufacturing a polymer-dispersed liquid crystal device including a neutralized conductive polymer transparent electrode, comprising:
   a) forming a first electrode layer by applying a conductive polymer ink composition including a neutralized PEDOT:PSS aqueous dispersion on a substrate layer and then performing thermal treatment;
   b) forming a polymer-dispersed liquid crystal layer on the first electrode layer;
   c) bonding a second electrode layer formed in the same manner as in a) to the polymer-dispersed liquid crystal layer; and
   d) curing the polymer-dispersed liquid crystal layer through irradiation with a light source,
   wherein the neutralized PEDOT:PSS aqueous dispersion is obtained by:
   a') mixing a PEDOT:PSS (poly(3,4-ethylenedioxythiophene):poly(styrenesulfonate)) aqueous dispersion with an amine compound and an organic solvent that undergoes phase separation from water so as to be neutralized;
   b') subjecting a mixed solution obtained in a') to phase separation into a lower water layer including the neutralized PEDOT:PSS aqueous dispersion and an upper organic layer including the amine compound and the organic solvent;
   c') removing the upper organic layer from the water layer and the organic layer, which are phase-separated; and
   d') washing the water layer having no organic layer with an organic solvent, thus removing the upper organic layer.

2. The method of claim 1, wherein the conductive polymer ink composition including the neutralized PEDOT:PSS (poly(3,4-ethylenedioxythiophene):poly(styrenesulfonate)) aqueous dispersion further comprises dimethyl sulfoxide (DMSO), an alcohol and a surfactant.

3. The method of claim 2, wherein an amount of the dimethyl sulfoxide (DMSO) is 0.3 to 5.0 wt % based on a total weight of the ink composition.

4. The method of claim 2, wherein the conductive polymer ink composition comprises a polyhydric alcohol.

5. The method of claim 1, wherein the conductive polymer ink composition has a pH of 4.0 to 8.0.

6. The method of claim 1, wherein the thermal treatment in a) is performed on a hot plate at 80 to 150° C. for 10 to 50 min.

7. The method of claim 1, wherein each of the first electrode layer and the second electrode layer has a thickness of 50 to 500 nm.

8. The method of claim 1, wherein the amine compound is at least one selected from the group consisting of 3,5-lutidine, 2,4,6-collidine and triethylamine.

9. The method of claim 1, wherein the organic solvent in a') is used in an amount of 50 to 500 parts by weight based on 100 parts by weight of the PEDOT:PSS aqueous dispersion.

10. The method of claim 1, wherein an amount of the PEDOT:PSS aqueous dispersion is 10 to 60 wt % based on a total weight of the ink composition.

* * * * *